United States Patent
Gerlach et al.

(10) Patent No.: US 9,968,966 B2
(45) Date of Patent: May 15, 2018

(54) ELECTROACOUSTIC TRANSDUCER

(71) Applicant: ROBERT BOSCH GMBH, Stuttgart (DE)

(72) Inventors: Andre Gerlach, Leonberg-Hoefingen (DE); David Bartylla, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 14/899,849

(22) PCT Filed: May 26, 2014

(86) PCT No.: PCT/EP2014/060758
§ 371 (c)(1),
(2) Date: Dec. 18, 2015

(87) PCT Pub. No.: WO2014/202332
PCT Pub. Date: Dec. 24, 2014

(65) Prior Publication Data
US 2016/0136689 A1 May 19, 2016

(30) Foreign Application Priority Data

Jun. 20, 2013 (DE) .......................... 10 2013 211 627

(51) Int. Cl.
*H01L 41/09* (2006.01)
*B06B 1/06* (2006.01)
(Continued)

(52) U.S. Cl.
CPC .......... *B06B 1/0655* (2013.01); *B06B 1/0685* (2013.01); *G01S 7/521* (2013.01);
(Continued)

(58) Field of Classification Search
CPC ..... B06B 1/0655; B06B 1/0685; G01S 7/521; G10K 9/22; G10K 11/004
(Continued)

(56) References Cited

U.S. PATENT DOCUMENTS 3,995,179 A   11/1976   Flournoy et al.
4,780,639 A   10/1988   Shirasu
(Continued)

FOREIGN PATENT DOCUMENTS

CN          1318965 A       10/2001
DE   10 2005 037 724        2/2007
(Continued)

OTHER PUBLICATIONS

International Search Report for PCT/EP2014/060758, dated May 26, 2014.

*Primary Examiner* — Thomas Dougherty
(74) *Attorney, Agent, or Firm* — Norton Rose Fulbright US LLP; Gerard Messina

(57) ABSTRACT

An electroacoustic transducer includes: a housing; an oscillating structure including at least one disk-shaped piezoelectric element having first and second surfaces; an acoustic transmitter; and electrical connecting element contacting electrodes of the piezoelectric element. The acoustic transmitter has parallel first and second surfaces, which first surface is joined to the first surface of the piezoelectric element, and which second surface is suitable for emitting and/or receiving sound waves. The distance between the second surface of the acoustic transmitter and the second surface of the piezoelectric element corresponds to ¼ of the resonance oscillation wavelength of the oscillating structure. The piezoelectric element is connected to the housing with the aid of a bearing structure which allows transverse strains of the piezoelectric element.

16 Claims, 6 Drawing Sheets

(51) Int. Cl.
  *G10K 9/22* (2006.01)
  *G10K 11/00* (2006.01)
  *G01S 7/521* (2006.01)
  *G01S 15/93* (2006.01)

(52) U.S. Cl.
  CPC ............. *G10K 9/22* (2013.01); *G10K 11/004* (2013.01); *G01S 2015/938* (2013.01)

(58) Field of Classification Search
  USPC ................................ 310/322, 324–327, 334
  See application file for complete search history.

(56) References Cited

U.S. PATENT DOCUMENTS

| | | |
|---|---|---|
| 5,351,375 A | 10/1994 | Ochiai et al. |
| 5,630,420 A | 5/1997 | Vaitekunas |
| 5,648,942 A | 7/1997 | Kunkel |
| 6,467,138 B1 | 10/2002 | Aime |
| 2007/0091719 A1 | 4/2007 | Falkenberg et al. |
| 2011/0006641 A1 | 1/2011 | Cross et al. |

FOREIGN PATENT DOCUMENTS

| | | |
|---|---|---|
| DE | 10 2008 018 110 | 10/2008 |
| DE | 10 2009 040 264 | 3/2011 |
| EP | 0 031 614 | 7/1981 |
| EP | 2 591 864 | 5/2013 |
| WO | WO 2011/090484 | 7/2011 |

ELECTROACOUSTIC TRANSDUCER

BACKGROUND OF THE INVENTION

1. Field of the Invention

The present invention relates to an electroacoustic transducer.

2. Description of the Related Art

A device for generating ultrasonic waves for a vehicle is known from published German patent application document DE 10 2009 040 264 A1, in which an elongated ultrasonic transducer for generating thickness mode oscillations is coupled to a planar component of a vehicle, in particular a bumper. The ultrasonic transducer includes a sequence of piezo disks and contacting and insulating layers, the length of the piezo disks being matched to the desired ultrasonic wave frequency in air. The piezo disks are made of a piezoceramic fiber composite which includes fibers extending in parallel to the center axis of the particular piezo disk or in parallel to the longitudinal axis. The assembly of piezo disks is furthermore situated in a support device. This assembly, in turn, is attached on the bumper.

Published German patent application document DE 10 2005 037 724 A1 describes an ultrasonic transducer having a piezoelectric transducer body situated between two electrodes. The transducer body includes at least two volume areas made of piezoelectric semiconductor material, which are separated from each other by a boundary layer having the height h'. A lattice-shaped configuration having rod-shaped transducer segments is shown, in which one of the areas has a rod-shaped design. The described embodiment is to be used to implement an ultrasonic transducer having a short decay time and a pivotable beam.

An ultrasonic sensor is derived from published German patent application document DE 10 2008 018 110 A1, which includes a piezoceramic element which excites a bumper to oscillate and is provided within a piezoceramic module. The module is integratable into the bumper so as not to be visible from the outside. In addition, ribbing is formed around the piezoceramic module, so that the stiffness of the bumper is variable in this area and the mechanical impedance jump between the bumper areas is settable.

Published international patent application document WO 2011/090484 A1 describes an ultrasonic transducer in the form of a thickness oscillator. Proceeding from a disk-shaped piezoceramic including electrodes, at least one front element is provided, which has such a shape that a desired radiation pattern is created. The length of the transmission path corresponds to $\lambda/4$ at a resonance frequency fR, so that an amplification of the oscillation, proceeding from the piezoceramic disk, on the radiating surface is achieved. It is furthermore described that a $\lambda/2$ oscillator is preferred for some applications, which is more robust in particular with respect to temperature stability, susceptibility to soiling, and deposits. Such a $\lambda/2$ oscillator 1 is shown in FIG. 8. It includes a front element 40 and a rear element 60, the respective length of the front and rear elements, plus half of the thickness of the piezoceramic disk 50, corresponding to one quarter of the wavelength $\lambda$ of the resonance oscillation. The advantage of such transducers is that they may be used as sensors for detecting surroundings of a vehicle or of a robot and may be integrated invisibly from the outside into body parts of the vehicle, for example the bumper, or into a lining part of the robot.

A $\lambda/2$ thickness oscillator 1 known from the related art, as shown in FIG. 8, has the disadvantage that it is very long. If the length is cut in half to send or receive with the aid of a $\lambda/4$ thickness oscillator, the surface of the piezoceramic disk situated opposite the front element must be connected to a sensor housing or a holding structure. If the piezoceramic is adhesively bonded to a substrate in a planar manner, or attached in another planar manner, for this purpose, this impedes the transverse contraction of the piezoceramic disk, whereby the sensitivity of the transducer is decreased.

BRIEF SUMMARY OF THE INVENTION

It is thus the object of the present invention to provide an electroacoustic transducer which has the advantageous properties of a $\lambda/4$ thickness oscillator with respect to the length, i.e., the size, and whose sensitivity nonetheless corresponds to that of a $\lambda/2$ thickness oscillator, or at least comes close to the same. According to the present invention, an impediment of the transverse contraction of the piezoelectric element is to be prevented.

An electroacoustic transducer is provided, which includes a housing, an oscillating structure including at least one preferably disk-shaped piezoelectric element having a first and a second surface, and an acoustic transmitter (also referred to as front element). To activate the piezoelectric element, electrical connecting means are provided, which are connected to electrodes of the piezoelectric element. The transducer according to the present invention functions according to the known principle. When the transducer is operated as a transmitter, the piezoelectric element is excited to carry out oscillations, which are transmitted to the front element and emitted as sound waves. When the transducer is operated as a receiver, incoming sound waves are converted into electrical signals by the piezoelectric element. The front element connects the surface of the sound reception to the piezoelectric element and thus acts as an acoustic transmitter. The generated oscillation is amplified by the resonant design of the component assembly.

The acoustic transmitter includes a first surface and a second surface in parallel to the first surface. It preferably has a rod-like design and may, for example, have a cylindrical or rectangular shape. The first surface of the acoustic transmitter is connected to the first surface of the piezoelectric element. The second surface, situated opposite to the first, of the acoustic transmitter is suitable for emitting or receiving sound waves. The distance between the second surface of the acoustic transmitter and the second surface of the piezoelectric element essentially corresponds to ¼ of the wavelength ($\lambda/4$) of a resonance oscillation of the oscillating structure. The oscillating structure thus represents a so-called $\lambda/4$ thickness oscillator, as it is known from the related art. The oscillation takes place primarily in a direction perpendicular to the surface of the piezoelectric element (thickness oscillation). During reception of acoustic oscillations, forces are thus exerted on the piezoelectric element, which cause longitudinal and transverse strains of the piezoelectric element. An impediment of this transverse strain would result in a decrease in the sensitivity of the transducer.

It is thus provided according to the present invention that the piezoelectric element is connected, for example via its second surface, to the housing with the aid of a bearing structure, the bearing structure being designed to allow transverse strains of the piezoelectric element. In other words, a secure mechanical attachment of the oscillating structure in the housing is achieved, without transverse strains or transverse contractions of the piezoelectric element being impaired by the attachment.

The bearing structure preferably includes multiple, in particular rod-shaped, support elements for this purpose, which extend between the second surface of the piezoelectric element and the housing, for example an internal surface of the housing. The support elements may include a ceramic material or a metal, for example. Materials having a great stiffness (i.e., a high modulus of elasticity) are preferred, in order to allow stiff support of the oscillator, for example an aluminum oxide ceramic or steel. However, it is also possible to use materials having a lesser stiffness (e.g., aluminum or brass), provided this is suitably considered in the dimensioning of the oscillating structure. The support elements prevent a displacement of the oscillating structure in the thickness direction and, through their low stiffness in the transverse direction, allow a transverse strain of the piezoelectric element. This is preferably achieved in that the support elements are designed in a rod shape, i.e., have comparatively large longitudinal dimensions and small dimensions in the transverse direction. The dimensions in the transverse direction may assume, for example, approximately ¼ to ¹/₂₀₀ of the transverse dimension of the piezoelectric element. Such dimensions allow a low stiffness of the support elements in the transverse direction to be achieved. The support elements follow the transverse movement of the piezoelectric element with little counteracting force. In this way, the rod shape advantageously achieves the effect according to the present invention that impediment of a transverse strain of the piezoelectric element is preferably minimized.

The rod-shaped support elements are preferably situated in parallel to each other in their longitudinal extension and have a respective cross section which is considerably smaller than the surface of the piezoelectric element. The support elements are preferably designed essentially identically to each other. However, it is also possible to provide support elements which are designed differently from each other, for example in that the shape and/or the cross section and/or the material of at least two support elements are different from each other.

One embodiment of the present invention in which the support elements are sheathed with an in particular flexible or elastic filling material or embedded into such a filling material is particularly preferred. For example, the material may include a polymer or a foam, for example the two-component silicone foam Fermasil (Sonderhoff) or an epoxy material. As a result of the sheathing with such a filling material, it is easier from a manufacturing perspective to achieve a regular arrangement of the support elements.

One embodiment of the present invention in which the support elements are designed in one piece with the piezoelectric element is preferred. For example, the support elements may already be formed during the production of the piezoelectric element. In this way, an attachment step during the assembly of the electroacoustic transducer according to the present invention is saved, and the overall configuration is simplified. The support elements are preferably connected to the housing with the aid of an electrically conductive adhesive. This allows the direct contacting of the piezoelectric element.

In one alternative embodiment of the present invention, the bearing structure is formed by situating the support elements on a base element or designing them in one piece with the base element. The base element is attached to the housing of the electroacoustic transducer, for example with the aid of adhesive bonding. This design also simplifies the assembly of the electroacoustic transducer.

In another alternative embodiment of the present invention, it is provided that the support elements themselves include a piezoelectric material, in particular a piezoceramic material. An assembly composed of such support elements aligned in parallel to each other is provided, the assembly of piezoelectrically active support elements forming the piezoelectric element of the electroacoustic transducer which is provided according to the present invention. Each individual support element acts as a separate piezoelectric element, each of the support elements preferably having a rod-shaped design and the support elements having end faces which are in parallel to each other. To form such a piezoelectric element, the individual support elements may be embedded into a flexible material, such as a foam or a polymer. A first end face of each support element is joined in each case to the first surface of the acoustic transmitter. The respective second end face of each support element is joined to the housing. The advantage of this design is that no separate bearing structure is required. The number of components of the electroacoustic transducer is thus further decreased and the overall size is reduced. For electrical contacting of the piezoelectric element, the electrical connecting means may be contacted at the end faces of the support elements, or alternatively may be contacted on opposing lateral surfaces of the support elements. A similar configuration of a piezoelectric element is known from so-called composite piezoceramics; however, contrary to the present invention, in the known composite piezoceramics, the piezoelectric rods act directly as oscillators for sound emission or for sound reception in relation to an abutting zone (e.g., air or water) and do not serve as support elements.

It is generally possible to design the support elements in a rod shape, i.e., for example, cylindrically, in a cuboid shape or, in general, in a prism shape. It is advantageous to design the support elements conically or in a truncated cone shape or pyramidally or in a truncated pyramid shape. In this case, it is advantageous to connect the respective smaller end face, or the tip of the cone or of the pyramid, to the piezoelectric element, and to connect the larger end face, i.e., the base area of the pyramid, of the truncated pyramid, of the cone or of the truncated cone, to the housing. In this way, the transverse strain of the piezoelectric element is impeded as little as possible, and nonetheless a durable mechanical connection of the support elements to the housing is created.

The acoustic transmitter of the electroacoustic transducer according to the present invention may have different designs. For example, it may be provided that the first surface of the acoustic transmitter and the second surface of the acoustic transmitter are different in size and/or different in shape. By adapting the ratio of the surfaces and with the aid of the particular shapes of the surfaces, it is possible to influence the resonance frequency of the oscillating structure.

Moreover, a certain radiation pattern of the emitted sound waves may be achieved.

In one embodiment of the present invention, the first surface of the acoustic transmitter essentially has a circular design, and the second surface of the acoustic transmitter essentially has a rectangular design. In this way, a fan-shaped radiation pattern is achieved. As an alternative, the first and the second surfaces of the acoustic transmitter may both essentially have a circular design, the diameter of the first surface being smaller or larger than the diameter of the second surface.

The present invention further relates to an assembly including an electroacoustic transducer according to one of the above-described embodiments and a cover element of a vehicle, in particular a bumper. This assembly is characterized in that the electroacoustic transducer is attached to an internal surface of the cover element in such a way that the electroacoustic transducer is not visible from the outside. The second surface of the acoustic transmitter is acoustically coupled to an area of the cover element, the cover element having a reduced thickness in this area. The assembly according to the present invention may be used, for example, as an ultrasonic sensor for a surroundings detection system of the vehicle.

To avoid an interfering transmission of the oscillation of the electroacoustic transducer to the entire cover element, and instead limit a localized oscillation to the area having the reduced thickness, it is suggested that this area has a thickness of 0.1 mm to 10 mm, at a radiation frequency of 40 kHz to 100 kHz.

To form the assembly according to the present invention, the housing of the electroacoustic transducer is preferably attached to the internal surface of the cover element with the aid of welding or adhesive bonding or screwing.

DETAILED DESCRIPTION OF THE INVENTION

Figure 1:
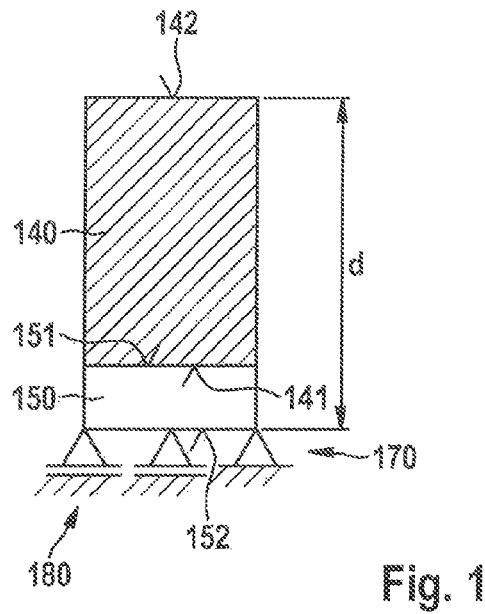
FIG. 1 schematically shows the connection according to the present invention of a $\lambda/4$ thickness oscillator to a housing.

FIG. 1 schematically shows how an oscillating structure, designed as a $\lambda/4$ thickness oscillator, is attached to a housing 180. To prevent the transverse strain of piezoceramic 150 of the $\lambda/4$ thickness oscillator from being impeded, according to the present invention a bearing 170 is created, as it is shown idealized in FIG. 1. In this way, the oscillation in the thickness direction is impeded, while the oscillation in the transverse direction is not. The impediment of the oscillation in the thickness direction makes the design as a $\lambda/4$ thickness oscillator, along with the advantage of the short construction associated therewith, possible.

Figure 2:
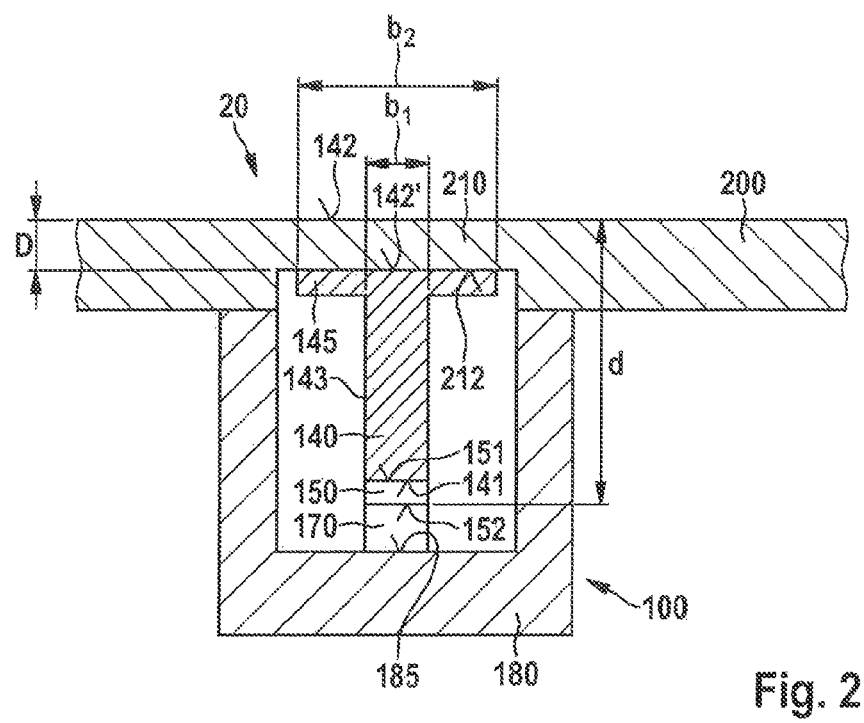
FIG. 2 shows an assembly according to the present invention of an electroacoustic transducer, which is attached to the internal side of a cover element of a vehicle.

One exemplary embodiment of the present invention is shown in FIG. 2. FIG. 2 shows an assembly of an electroacoustic transducer 100 on the internal side of a bumper 200 of a vehicle. Only a section of bumper 200 is shown. Electroacoustic transducer 100 includes a housing 180 and an oscillating structure including at least one disk-shaped piezoelectric element 150 made of a piezoceramic, which has a first surface 151 and a second surface 152 in parallel to the first. The oscillating structure furthermore includes an acoustic transmitter 140, which in this example includes a rod 143 and a disk 145. The acoustic transmitter is made of a metal, such as aluminum or brass, or a stiff plastic, such as an epoxy resin, for example. Furthermore, electrical connecting means for contacting the electrodes of piezoelectric element 150 are provided; however, they are not shown here for the sake of clarity. Rod 143 has a first surface 141 having a diameter $b_1$, which is joined to first surface 151 of piezoelectric element 150, for example with the aid of an adhesive. At its end facing away from piezoelectric element 150, rod 143 includes a disk 145 having a larger diameter $b_2$. A second surface 142' of acoustic transmitter 140 or of disk 145 is joined to an internal surface 212 of bumper 200, bumper 200 in this joining area 210 having a reduced thickness D. Area 210 is thus able to oscillate, and only a small portion of structure-borne noise is transmitted to the remainder of the bumper. Outwardly facing surface 142 of area 210 is thus suitable for emitting or receiving sound waves. The oscillating structure thus includes piezoelectric element 150, acoustic transmitter 140 composed of rod 143 and plate 145, and area 210 of bumper 200 and is designed as a $\lambda/4$ thickness oscillator. In other words, distance d, measured from surface 142 to second surface 152 of piezoelectric element 152, essentially corresponds to ¼ of wavelength $\lambda$ of a resonance oscillation of the oscillating structure.

The shape of the cross section of rod 143 may be freely selected, for example circular, elliptic, or rectangular. The cross-sectional shapes of piezoelectric element 150, of rod 143 and of plate 145 may also be different from each other. Moreover, the ratio of diameters $b_1/b_2$ is freely selectable. By selecting dimension $b_2$, both the radiation pattern (directivity pattern of the sound emission and of the sound reception) and the resonance frequency of the $\lambda/4$ oscillator are settable. The thickness of plate 145 also influences these. Plate 145 and rod 143 may be manufactured separately, for example, and may subsequently be combined with the aid of a suitable joining method, e.g., adhesive bonding, welding or screwing.

Housing 180 has a pot-shaped design in this example and preferably has a high acoustic impedance, i.e., has a great stiffness and/or mass.

The attachment or connection according to the present invention of piezoelectric element 150 to housing 180, or more precisely to housing internal surface 185, with the aid of a suitable bearing structure 170 (shown only schematically here) may be implemented in a variety of ways. The commonality lies in a preferably low impediment of the transverse strain. Various options for forming bearing structure 170 are described hereafter in greater detail.

Figure 3:
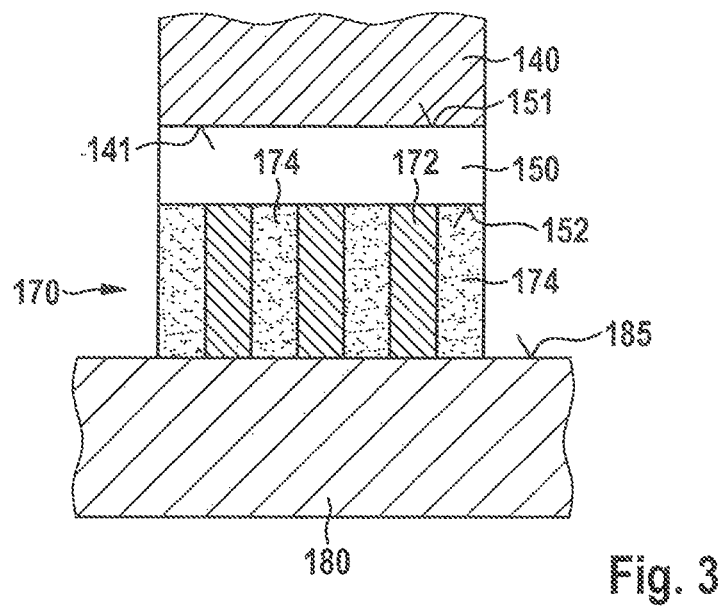
FIG. 3 shows a detail of an electroacoustic transducer having a bearing structure according to a first embodiment of the present invention.

FIG. 3 shows a first embodiment of bearing structure 170 according to the present invention in detail. In this embodiment, bearing structure 170 includes multiple rod-shaped support elements 172, which are situated in parallel to each other and extend between second surface 152 of piezoelectric element 150 and housing 180 or housing internal surface 185. Support elements 172 prevent a displacement of the oscillating structure in the thickness direction and, through their low stiffness in the transverse direction, allow a transverse strain of piezoelectric element 150. To allow support elements 172 to be situated at regular intervals, they are sheathed with a filling material 174, which in particular fills the spaces between the rods. Metals, ceramics and plastics may be selected as material for support elements 172. Filling material 174 is preferably a flexible material, such as a polymer or a foam.

Figure 4:
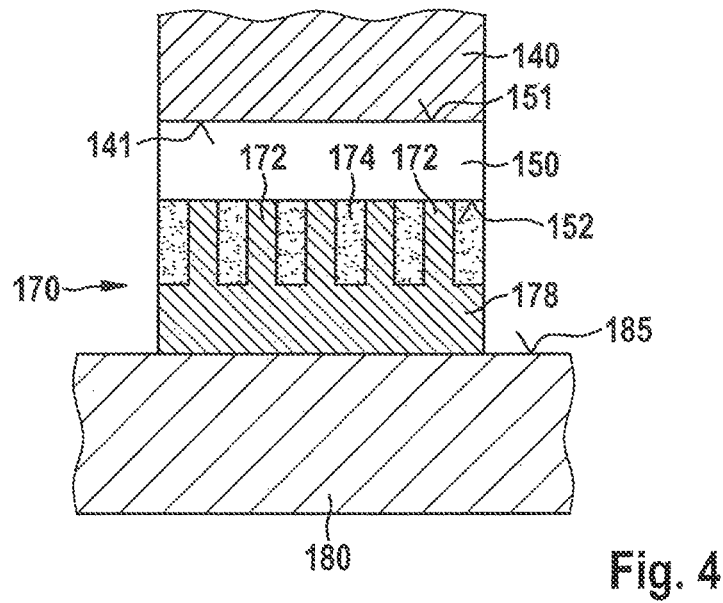
FIG. 4 shows a detail of an electroacoustic transducer having a bearing structure according to a second embodiment of the present invention.

FIG. 4 shows a modified embodiment of a bearing structure 170 according to the present invention. Rod-shaped support elements 172, which are situated in parallel to each other, are also provided here. Support elements 172 are situated on a shared plate 178, which serves as the base element for support elements 172. Support elements 172 may preferably be designed in one piece with plate 178. Plate 178 is preferably made of a metal or a ceramic and is attached to housing 180 with the aid of adhesive bonding or welding, for example. It is also conceivable to design plate 178 and/or support elements 172 directly in one piece with housing 180.

Figure 5:
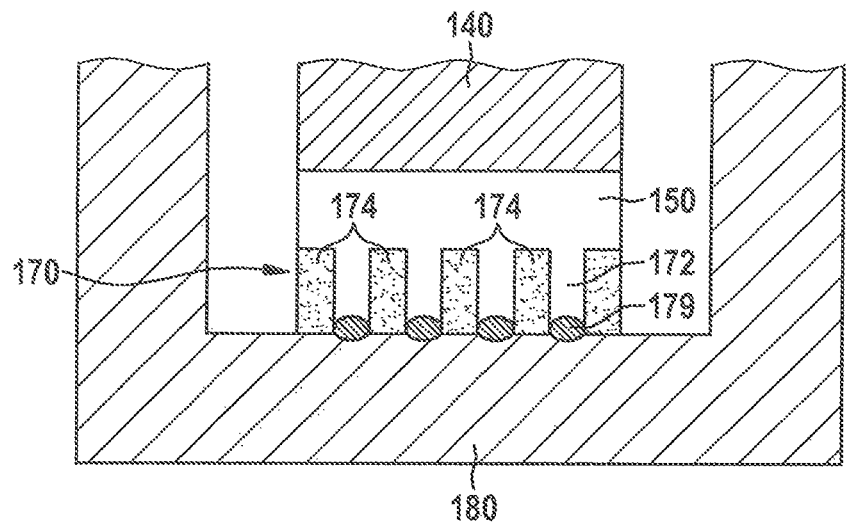
FIG. 5 shows a detail of an electroacoustic transducer having a bearing structure according to a third embodiment of the present invention.

FIG. 5 shows a further variant of a bearing structure 170 according to the present invention. In this exemplary embodiment as well, bearing structure 170 includes multiple rod-shaped support elements 172, which are sheathed with a filling material 174. Contrary to the above-described specific embodiments, however, support elements 172 are designed in one piece with piezoelectric element 150 here. This results in the option of electrically contacting the piezoelectric element directly via housing 180, which in this case is metallic. For this purpose, the end faces of support elements 172 are mechanically and electrically connected to housing 180 with the aid of an electrically conductive adhesive 179. No additional electrical lines are thus necessary.

FIG. 5 shows a fourth variant of a bearing structure 170 according to the present invention. A piezoelectric element 150 is provided, which is composed of multiple rod-shaped elements 175 situated in parallel, which include a piezoelectrically active material, such as a piezoceramic. Rod-shaped elements 175 are oriented in such a way that they extend between first surface 141 of acoustic transmitter 140 and housing 180. Rod-shaped elements 175 are embedded into a flexible material 174, so that an impediment of the transverse strain of the individual rod-shaped elements 175 is prevented.

Piezoelectric element 150 thus itself forms bearing structure 170.

Figure 6:
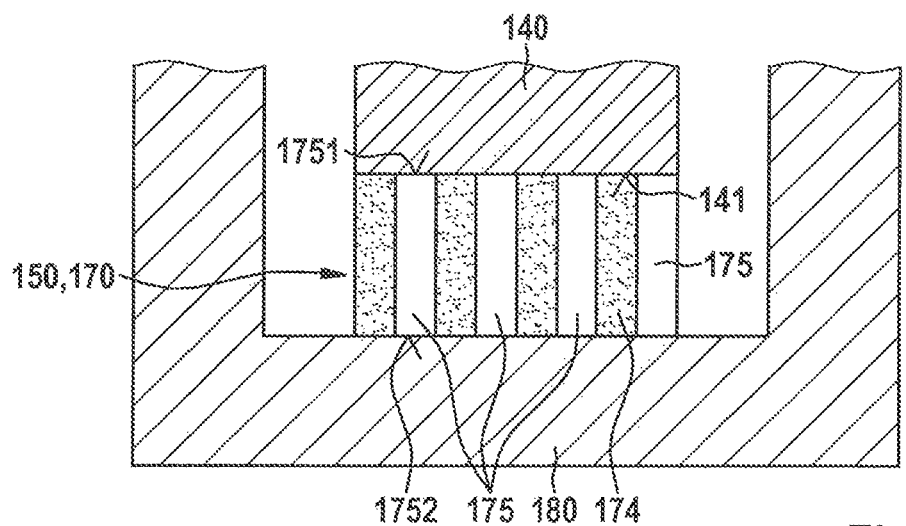
FIG. 6 shows a detail of an electroacoustic transducer having a bearing structure according to a fourth embodiment of the present invention.
Figure 6A:
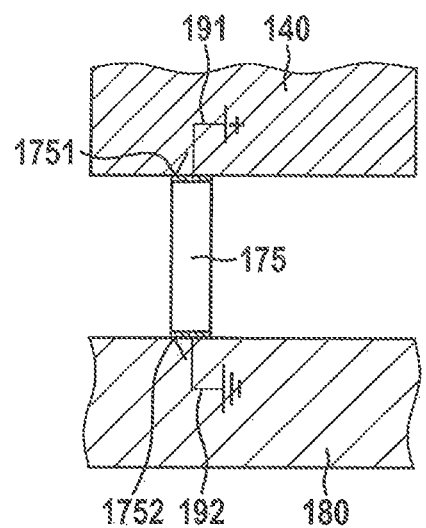
FIG. 6a schematically shows a detailed view of a first option of the contacting of the piezoelectric element of FIG. 6.
Figure 6B:
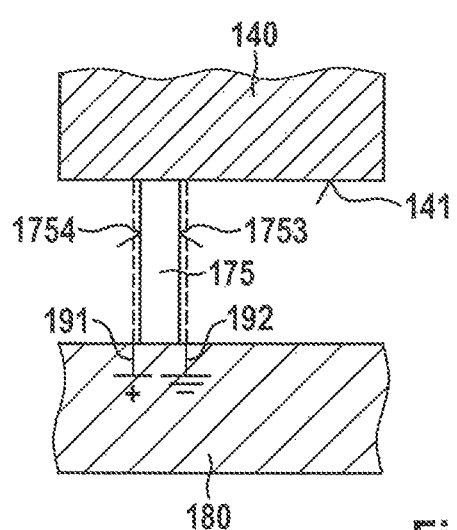
FIG. 6b schematically shows a detailed view of a first option of the contacting of the piezoelectric element of FIG. 6.

As is shown in detail in FIGS. 6a) and 6b), the electrical contacting of a piezoelectric element 150 thus composed may be implemented in two ways. For the sake of better clarity, FIGS. 6a) and 6b) each show only a single rod-shaped element 175 by way of example. Each rod-shaped element 175 has a first and a second end face 1751, 1752. First end faces 1751 are joined to first surface 141 of acoustic transmitter 140. Second end faces 1752 are joined to housing 180. An electrical contacting 191, 192 may take place either via end faces 1751, 1752, as shown in FIG. 6a), or via two lateral surfaces 1753, 1754, as shown in FIG. 6b). In the shown different contacting options, the different oscillating properties of piezoelectric element 150 are converted differently as an electrical output signal. If the electrodes are positioned on end faces 1751 and 1752, the so-called d33 effect is utilized, i.e., the electrical field and the propagation direction of the oscillation are aligned in parallel. If the electrodes are positioned on lateral surfaces 1753 and 1754, the d31 effect is utilized, i.e., the electrical field and the propagation direction of the oscillation are aligned perpendicularly to each other. Depending on the selected piezoelectric material, the d33 effect or the d31 effect may be greater.

Figure 7:
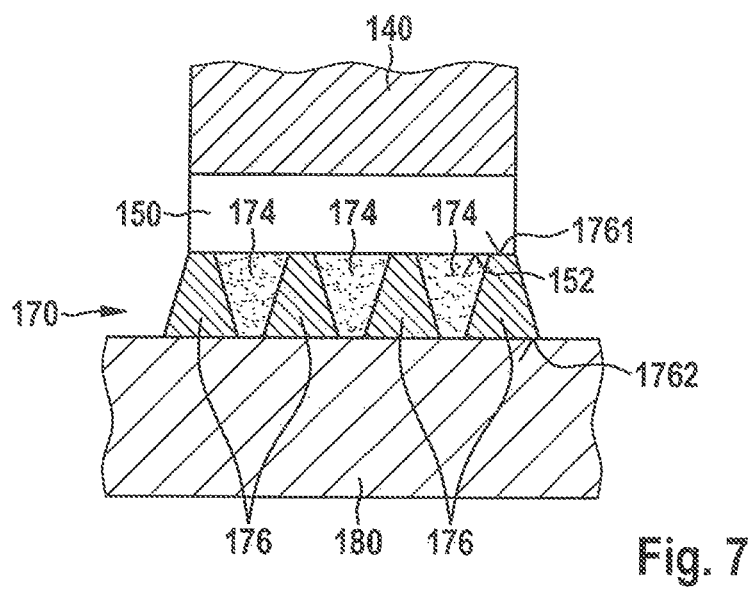
FIG. 7 shows a detail of an electroacoustic transducer having a bearing structure according to a fifth embodiment of the present invention.
Figure 8:
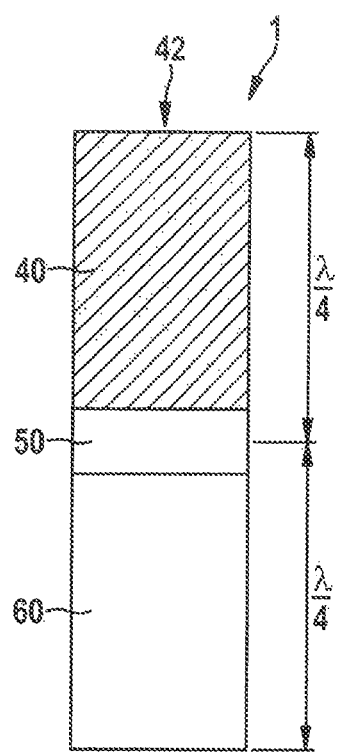
FIG. 8 shows a $\lambda/2$ thickness oscillator according to the related art.

FIG. 7 shows a fifth embodiment of a bearing structure 170 according to the present invention. This embodiment largely corresponds to the exemplary embodiment of FIG. 3. However, it has the essential difference that support elements 176 are not designed to be rod-shaped here, but truncated. The particular base area 1762 of the truncated cone, i.e., the larger surface, is joined to housing 180, and the particular cover surface 1761 is joined to second surface 152 of piezoelectric element 150. In this way, the transverse strain of the piezoelectric element is impeded as little as possible, and nonetheless a durable mechanical connection of the support elements to the housing is created.

What is claimed is:

1. An electroacoustic transducer, comprising:
    a housing;
    an oscillating structure including at least one disk-shaped piezoelectric element having a first surface and a second surface;
    an acoustic transmitter; and
    at least one electrical connecting element for contacting electrodes of the piezoelectric element;
    wherein the acoustic transmitter has a first surface and a second surface in parallel to the first surface of the acoustic transmitter, the first surface of the acoustic transmitter being joined to the first surface of the piezoelectric element, and the second surface of the acoustic transmitter being configured to at least one of emit and receive sound waves, and wherein a distance between the second surface of the acoustic transmitter and the second surface of the piezoelectric element essentially corresponding to ¼ of a wavelength of a resonance oscillation of the oscillating structure, and wherein the piezoelectric element is connected to the housing with the aid of a bearing structure configured to allow transverse strains of the piezoelectric element.

2. The electroacoustic transducer as recited in claim 1, wherein the bearing structure includes multiple support elements which extend between the second surface of the piezoelectric element and a housing internal surface.

3. The electroacoustic transducer as recited in claim 2, wherein the support elements are sheathed with a filling material including a flexible material.

4. The electroacoustic transducer as recited in claim 2, wherein the support elements are configured integrally in one piece with the piezoelectric element.

5. The electroacoustic transducer as recited in claim 4, wherein the support elements are connected to the housing with the aid of an electrically conductive adhesive.

6. The electroacoustic transducer as recited in claim 2, wherein the bearing structure includes a base element which is attached to the housing and on which the support elements are situated.

7. The electroacoustic transducer as recited in claim 1, wherein the piezoelectric element includes multiple rod-shaped elements which each have end faces in parallel to each other, a first end face of each rod-shaped element being connected to the first surface of the acoustic transmitter and a second end face of each rod-shaped element being connected to the housing, whereby the piezoelectric element forms the bearing structure.

8. The electroacoustic transducer as recited in claim 7, wherein the at least one electrical connecting element contacts the first and second end faces of the rod-shaped elements.

9. The electroacoustic transducer as recited in claim 7, wherein the at least one electrical connecting element contacts opposing lateral surfaces of the rod-shaped elements.

10. The electroacoustic transducer as recited in claim 8, wherein the support elements have one of a conical or truncated shape.

11. The electroacoustic transducer as recited in claim 8, wherein the first surface of the acoustic transmitter and the second surface of the acoustic transmitter are at least one of different in size and different in shape.

12. The electroacoustic transducer as recited in claim 11, wherein the first surface of the acoustic transmitter has essentially a circular configuration, and the second surface of the acoustic transmitter has essentially a rectangular configuration.

13. The electroacoustic transducer as recited in claim 11, wherein the first and second surfaces of the acoustic transmitter both have essentially a circular configuration, the diameter of the first surface being different from the diameter of the second surface.

14. An assembly, comprising:
an electroacoustic transducer including:
a housing;
an oscillating structure including at least one disk-shaped piezoelectric element having a first surface and a second surface;
an acoustic transmitter; and
at least one electrical connecting element for contacting electrodes of the piezoelectric element;
wherein the acoustic transmitter has a first surface and a second surface in parallel to the first surface of the acoustic transmitter, the first surface of the acoustic transmitter being joined to the first surface of the piezoelectric element, and the second surface of the acoustic transmitter being configured to at least one of emit and receive sound waves, and wherein a distance between the second surface of the acoustic transmitter and the second surface of the piezoelectric element essentially corresponding to ¼ of a wavelength of a resonance oscillation of the oscillating structure, and wherein the piezoelectric element is connected to the housing with the aid of a bearing structure configured to allow transverse strains of the piezoelectric element;
a cover element of a vehicle;
wherein the electroacoustic transducer is attached to an internal surface of the cover element in such a way that the electroacoustic transducer is not visible from the outside, and the second surface of the acoustic transmitter is acoustically coupled to a selected area of the cover element, the cover element having a reduced thickness in the selected area in comparison to remaining areas of the cover element.

15. The assembly as recited in claim 14, wherein the cover element has a thickness between 0.1 mm and 10 mm in the selected area.

16. The assembly as recited in claim 14, wherein the housing of the electroacoustic transducer is attached to the internal surface of the cover element with the aid of one of welding, adhesive bonding or screwing.

* * * * *